Figure 1:
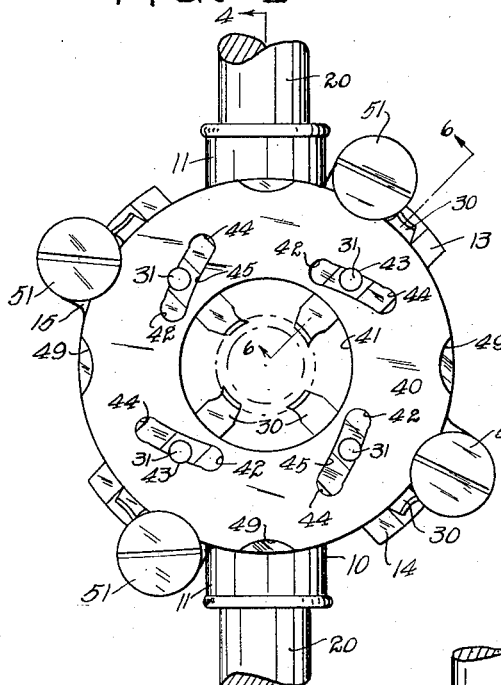

Oct. 18, 1932.   B. T. BORDEN   1,883,333
DIESTOCK
Filed Aug. 16, 1930   2 Sheets-Sheet 1

Inventor
Bradford T. Borden,
By Baker, Golrick & Teare
Attorneys

Oct. 18, 1932. B. T. BORDEN 1,883,333
DIESTOCK
Filed Aug. 16, 1930 2 Sheets-Sheet 2
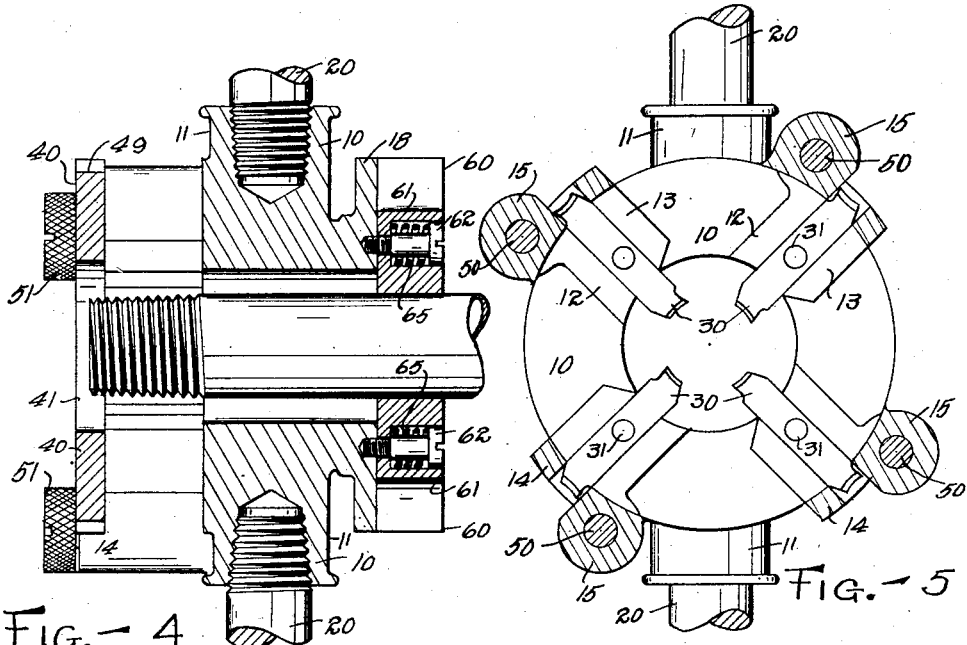
FIG.-4
FIG.-5
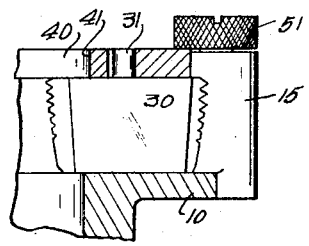
FIG.-6
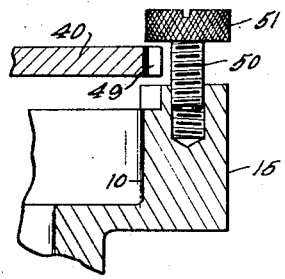
FIG.-7
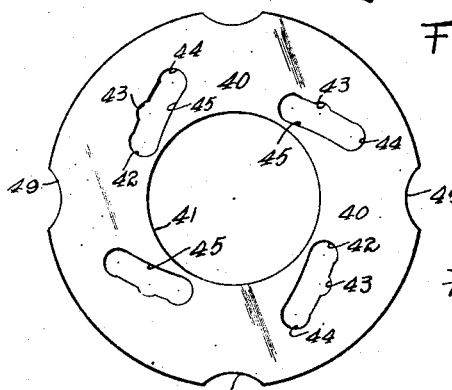
FIG.-8
Inventor
Bradford T. Borden
By Bates, Golrick & Fearn
Attorneys Patented Oct. 18, 1932

1,883,333

UNITED STATES PATENT OFFICE

BRADFORD T. BORDEN, OF LAKEWOOD, OHIO, ASSIGNOR OF ONE-HALF TO WILLIAM A. NERACHER, OF WARREN, OHIO, AND ONE-HALF TO THE BORDEN COMPANY, OF WARREN, OHIO, A CORPORATION OF OHIO

DIESTOCK

Application filed August 16, 1930. Serial No. 475,781.

This invention relates to a die stock of the type wherein the chasers remain in fixed position during the thread cutting operation. One of the objects of the invention is to provide such a tool in a compact and simple form adapted to be cheaply produced, and, to that end, I provide a very simple readily removable clamping device adapted to hold the chasers in position. My invention also contemplates means for positively holding the chasers in various positions, whereby different sizes of pipe may be threaded by the same tool. My tool is adapted for carrying chasers with cutting teeth on both ends, so that by reversing the chasers the number of sizes which may be cut is doubled. Thus, in one tool, I can thread for instance a pipe of 1/4", 3/8", 1/2" and 3/4" sizes, or in a larger tool 1", 1 1/4", 1 1/2" and 2" sizes.

My die stock is illustrated in the drawings hereof, is hereinafter more fully explained, and its essential novel features are summarized in the claims.

Figure 2:
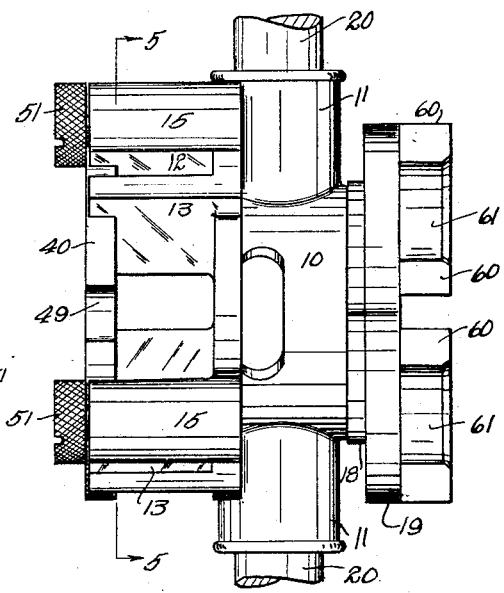
Figure 3:
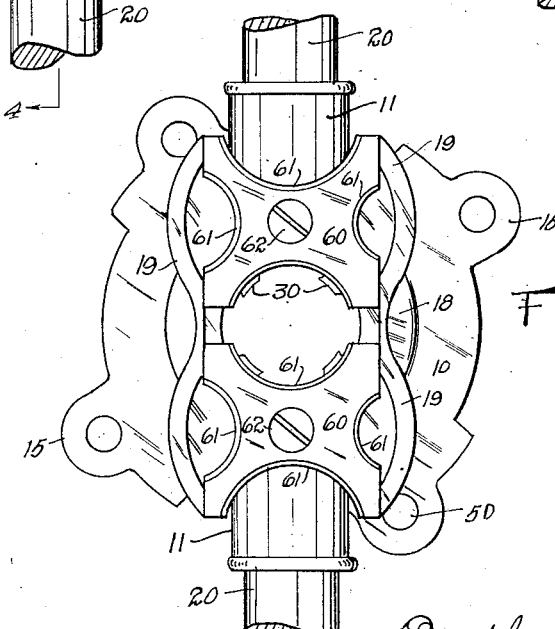

In the drawings Fig. 1 is a face view of my die stock. Fig. 2 is a side elevation thereof. Fig. 3 is a rear view. Fig. 4 is an axial section. Fig. 5 is a section in a plane parallel with Fig. 1, as indicated by the line 5—5 on Fig. 2. Fig. 6 is a fragmentary radial section on 6—6 on Fig. 1. Fig. 7 is a view similar to Fig. 6, but showing the clamping plate in released position. Fig. 8 is a face view of the clamping plate.

The frame of my die stock comprises a suitable hollow member 10, which may be a single integral casting, carrying the thread-cutting chasers adjacent one end and a suitable pipe guide adjacent the other. Intermediately, means are provided for rotating the frame. I have shown for this purpose the frame equipped with two diametrically opposite sockets 11 into which suitable handles 20 may extend, though any other means may be provided for rotating the frame.

On one side of its intermediate region, the frame is provided with a number of equidistant housings for the chasers, each housing comprising a pair of parallel bosses 12 and 13 leaving a parallel-sided recess between them.

Each recess is adapted to be occupied by a parallel-sided chaser 30. On opposite sides, the chaser is slidably guided by the bosses 12 and 13, while the inner face of the chaser rests upon the frame 10 at the bottom of the housing, which in this region lies in a single plane. Each chaser 30 is formed with an upstanding lug or pin 31 which is adapted to coact with an annular clamping plate which serves the double purpose of holding the chasers down against the frame and of defining their positions.

The clamping plate above mentioned is best shown at 40 in Figs. 1 and 8. It has a central opening 41 of a greater diameter than the largest size of pipe within the range of the die stock, and in use is rigidly clamped to the frame. The plate is provided with openings which receive the chaser pins 31 to define the position of the chasers, these openings being so arranged that the chaser may be held positively in any one of several positions.

In the clamping plate shown, the defining openings are in the form of peculiarly placed slots 45. These slots are some distance back from the inner periphery of the plate and diverge from a region near that periphery. Each slot has a substantially semi-circular end 42 near such inner periphery and a substantial semi-circular end 44 a considerable distance back. The walls of the slot connecting these end portions and preferably flatly arcuate, an important feature being that in an intermediate region of the outer wall is a depression 43 adapted to coact with the chaser pin and locate the chaser definitely in its intermediate position. Thus, when each slot 45 receives the pin 31 of the corresponding chaser, if that pin is against the end 42 of the slot the chaser is in its innermost position; when the pin is against the end 44 the chaser is in its outermost position, and when the pin is occupying the depression 43 the chaser is in desired position in its intermediate location.

The clamping plate rests against the faces of the bosses 12 and 13 and is concentrically held by arcuate lugs 14 at the outer edges of such bosses which engage the circular periphery of the clamping plate. The clamping plate is held on the frame by screws 50 (four being shown), which are threaded in the frame bosses 15 and have their heads 51 overhanging the clamping plate, these bosses being integral with the frame but located externally of the main portion thereof.

To enable the clamping plate to be readily removed without requiring the entire removal of the screws from the frame, I form arcuate recesses 49 in the outer periphery of the plate which are normally out of registration with the screw heads, but which when the plate is given an angular movement into an abnormal position, may be caused to register with such heads, and are of such size that the plate may then be withdrawn between the heads.

When the screws 50 are turned into place the clamping plate is held rigidly on the frame and also efficiently engages the outer faces of the chasers. The chasers which are thus completely housed, are rectangular in cross section, are thus not only definitely located by their pins 31 seating in specially positioned openings but may be tightly clamped in place by the tightened clamping plate.

If the die stock is set, for example, for the smallest pipe to be threaded, the chaser pins 31 will occupy the ends 42 of the slots in the plate 40. Now to reset the die stock for the next larger size of pipe it is only necessary to loosen the screws 50, and to shift the plate until the pins 31 engage the slot depressions 43 and then reclamp the plate.

The adjustment described is sufficient for two adjacent size of pipe, which have the same pitch for threads and may be cut by the same chaser teeth. To enable the same die stock to handle larger sizes, I form different teeth on opposite ends of the chasers 30; then by loosening the screws and raising the clamping plate, as illustrated in Fig. 7, I can take the chasers out and turn them end-for-end; after which the clamping plate is restored.

The pins 31 are a short distance from the mid-region of the chasers toward the end having the coarser teeth, so that when the chasers are reversed if the pins occupy the depression 43 a position is provided suitable for the smaller one of the two larger sizes. To set the die stock for the largest size the clamping screws are loosened and the chaser pins are caused to engage the ends 44 of the slots. Accordingly by providing the three positions of the clamping ring and the double ended chasers I am enabled to adapt the die stock for threading four sizes of pipe.

It is necessary to provide variable guiding means for the different sizes of pipe. This could be effected by making the guiding opening in the frame of a size corresponding to the largest size of pipe, and providing three bushings of different thicknesses for the other three sizes, or I may employ the permanently-mounted settable guide which is illustrated herein, but which forms the basis of a copending application of mine. Briefly this guide operates as follows:

As shown, the frame 10 has on the side opposite the chaser housings, a flat rectangular extension 18 bounded by a pair of ribs 19. Between these ribs, I provide a pair of square blocks 60 having on their four sides different arcuate recesses 61 forming portions of two cylinders corresponding to the exterior of the four sizes of pipe with which the die stock may be used. Each block is pivotally secured to the frame by a screw 62 which passes through the center of the block and is threaded in the frame. The head of this screw occupies a cylindrical cavity in the block and compresses a helical spring 65 against the base of the cavity. However, by simply grasping the block by one's thumb and finger in two of the opposed recesses 61, one may pull the block outwardly until it can clear the ribs 19 and then give it a quarter turn, or a multiple thereof, to present a different recess to the die stock axis.

It will be seen that my die stock comprises very few parts, and these may be of comparatively light construction, so that I provide a tool which has the advantages of lightness, compactness, and cheapness of manufacture, and at the same time is adapted for many different sizes of pipe. The notching of the outer periphery of the clamping plate enables its entire removal very readily, which entirely frees the chasers for removal for cleaning or repair, as well as for reversal.

I claim:

1. In a die stock, the combination of a hollow frame, chaser guides carried thereby, chasers occupying said guides and having shoulders, and an annular clamping plate having slots, one for each chaser, positioned obliquely to the chaser guides and each adapted to coact with the chaser shoulder in various positions of the plate, each slot having an intermediately located recess at that side of the slot which is farther from the plate axis to define an intermediate position of the chaser and hinder the outward thrust on the chaser from rotating the plate.

2. The combination of a hollow frame, chaser guides carried thereby, chasers occupying said guides and having outwardly projecting pins, and an annular clamping plate having slots through it, one for each chaser and adapted to receive the pin of the corresponding chaser, each slot being oblique to the chaser guide and having an intermediately located recess at that side of the slot which is farther from the plate axis.

3. The combination of a hollow frame, chaser guides carried thereby, chasers occupying said guides, and each having an outwardly projecting pin, a clamping ring having slots through it adapted to receive the pin of the corresponding chaser, each slot being oblique to the chaser guide and having enlarging recesses at intervals in that side of the slot which is farther from the plate axis, thereby defining a group of positions for each chaser, said slots being located back of the inner periphery of the ring, and completely embraced by the body of the ring, whereby the chasers may be held against inward as well as outward movement.

In testimony whereof, I hereunto affix my signature.

BRADFORD T. BORDEN.